United States Patent [19]

Hoang

[11] 4,064,444
[45] Dec. 20, 1977

[54] METHOD AND SELF-ADAPTING DAMPER SYSTEM HAVING ENERGY BALANCE

[75] Inventor: Don-Tri Hoang, Maurepas, France

[73] Assignee: Societe Francaise d'Equipments pour la Navigation Aerienne, Villacoublay, France

[21] Appl. No.: 563,201

[22] Filed: Mar. 28, 1975

[30] Foreign Application Priority Data

Mar. 29, 1974  France .................................. 74.11493

[51] Int. Cl.² ............................................ G05B 13/00
[52] U.S. Cl. ...................................... 318/561; 318/615
[58] Field of Search ............... 318/561, 615, 616, 617, 318/618, 620

[56] References Cited

U.S. PATENT DOCUMENTS

| | | | |
|---|---|---|---|
| 3,184,662 | 5/1965 | Wallace ................................ | 318/618 |
| 3,216,676 | 11/1965 | Brown et al. .................... | 318/561 X |
| 3,506,896 | 4/1970 | Loos ..................................... | 318/561 |
| 3,803,506 | 4/1974 | Hughes ............................ | 318/561 X |
| 3,864,554 | 2/1975 | Chevalier ............................. | 318/561 |
| 3,911,345 | 10/1975 | Totten .................................. | 318/561 |
| 3,935,523 | 1/1976 | Cleveland et al. ................... | 318/616 |

Primary Examiner—B. Dobeck

[57] ABSTRACT

A damping system is provided which is a self-adaptive damping system with an energy balance characteristic. The system has a conventional control chain and feedback loop which includes a detection means, an optional corrector, and a controllable damping device. In addition the system further includes an adaptation loop which is at least partly in parallel with the feedback loop and is coupled to and utilizes the information delivered by the detection device. The adaptation loop is coupled to and effects control of the damping device. The adaptation loop includes a comparator, an integrator and two parallel circuits furnishing to the comparator one signal which is a function of the energy of the slow mode of the system to be regulated in the occurrence of the process mode and a second signal which is a function of the product of the energy of the rapid mode and of the relation of the logarithmic decrements of these two modes. The comparator furnishes a result of the comparison to the aforenoted integrator which is connected to the controllable damping device. The invention also provides the method performed by the aforesaid equipment.

9 Claims, 1 Drawing Figure

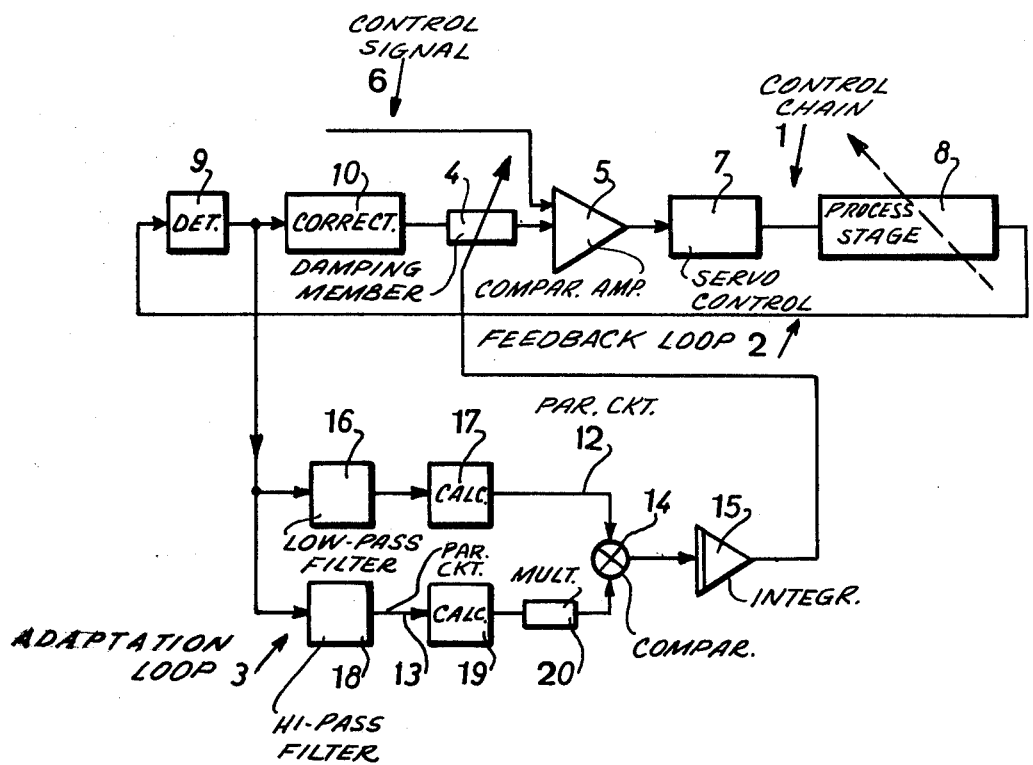

METHOD AND SELF-ADAPTING DAMPER SYSTEM HAVING ENERGY BALANCE

FIELD OF INVENTION

The present invention relates to methods for self-adaptive damping with energy balances and is susceptible of application to various types of servo-systems. The invention also relates to systems for effecting the above-mentioned methods.

BACKGROUND

In general, it is known that, in a servo-system, the modes of operation of certain elements are necessarily different. For example, the mode of the control element should be performed in a frequency range much higher than that of the mode of the controlled process.

As a consequence, the fundamental problem of a damping system is to assure a sufficient stability for the base mode, for example, the mode in which the process evolves (when this evolves in a very large domain) without this destabilizing one or more antagonistic modes, namely the high frequency modes. The ideal would be to be able to detect logarithmic decrements of these modes and to regulate them to remain greater than or equal to certain pre-determined values. However, experience shows that it is not easy to detect the dampings correctly for systems having multiple modes or when the initial conditions are of any values whatever.

In order to try to obtain these results, a number of solutions have been advanced, but these solutions have never given complete satisfaction. Among these solutions can be cited firstly the method of frequency detection. This solution appears to be very attractive from the theoretical viewpoint, but is found to be realizable only with great difficulty in practice and even unobtainable in certain cases because the frequency of a power member, affected by non-linearity, is undefinable.

Another solution consists of the utilization of passive adaptive "non-linear" systems. The study and the realization of these systems, however, have shown a number of weaknesses. For example because of "passivity" due to the freezing of their regulation, these systems have poorer performance than "active systems" which effect a proper change of parameter.

There can also be mentioned systems having reference models which require intentional load or test integration to identify the process course, that is to say to determine the value of the variable parameters in the domain of operation of the process course in order to realize the necessary corrections.

These systems have the disadvantage of imposing a certain proper frequency and a damping which is unacceptable in a number of processes in which it is undesirable for the proper frequency to be identical in all regimes of operation. Additionally, these systems require, as a consequence a substantial control energy for a great variation of the parameter.

SUMMARY OF INVENTION

It is an object of the invention to avoid all of the above-mentioned disadvantages.

For this purpose, the invention utilizes a self-adaptive damping process whose criterion of performance to be maintained is the damping and therefore the stability of the system regulated, and which necessitates no intentional inquiry to identify the process. The process is of more simple conception then processes having as a base the detection of frequency and it permits effecting proper changes of various parameters. It should also be noted that the process can be applied to a number of process steps either in the aeronautical or aerospace industry or in the industrial area.

BRIEF DESCRIPTION OF DRAWING

An embodiment of the invention will be described hereafter by way of non-limitative example with reference to the annexed drawing in which the single FIGURE is a schematic block diagram of a regulation system utilizing a self-adapting damping system with energy balance.

DETAILED DESCRIPTION

The invention has as a characteristic feature the establishment of a simple relationship between energy and the logarithmic decrement of time response of a regulated system whereby one of the modes thereof leads to the regulation of the system.

It is clear that, from such relation, it is sufficient to act on the energy of a mode of a regulated system to regulate its logarithmic decrement. This method which will hereafter be referred to as the "method of energy balance" is particularly beneficial for the handling of problems of self-adaptation since it is known that a small modification in the internal dynamics of the servo-loop is sufficient to sensitize the mechanism for distribution of energy.

In fact, according to the invention, the philosophy of the "method of energy balance" depends on two mathmatical relations, one of which is rigorous and the other of which is approximate.

The first relation is useful for a linear system of closed loop whatever its order, provided that in the transfer function, in closed loop with unity return, the order of the denominator exceeds that of the numerator by more than 1°. This relation expresses the constancy of the sum of the logarithmic decrements of all modes of movement constituting the loop system; which in other words states that an increase of stability of one mode obtained by a change of regulation (in this case a change of gain) is compensated by loss of stability of one or a plurality of other modes. One type of displacement of stability is thus effected at the interior of the system.

The second relationship associates the relation of the energy of the modes with respect to the corresponding logarithmic decrements. It establishes the correspondence between the notions of energy and of stability and further the energy of the different modes as a function of the adjustable gain. The two relations clearly result from the study of the regulated system effected hereinafter.

For reasons of simplicity of calculations, the explanation will be given for a basic system of fourth order essentially comprising:

$$M(s) = \frac{\Omega_o^2}{s^2 + 2 D_o s + \Omega_o^2}$$

in which: o is the pulse $\Omega_o$ is the pulse proper in open loop of the servo-control;

$s$ is the Laplace operator; and $d_o$ is the logarithmic decrement of the servocontrol mode in open loop;

and a controlled process having a transmittance (s) of the form;

$$A(s) = \frac{-m\,Kx\,(s+a)}{s^2 + 2d_o s + \omega_o^2}$$

in which:
$\omega_o$ is the pulsation proper of the aircraft,
$d$ is the logarithmic decrement of the process mode in open loop,
$m$ is the high frequency gain of the process,
$Kx$ is the gain of the damping system of the regulation, and
$a$ is the time constant associated with the process.

It should be noted that in one such system there only exists two forms of movements. Consequently, in the description, $q_1$ will be hereafter called the time-response controlled process, that is to say, of the slow mode and $q_2$ will be the time response of the servo-control, that is to say, the rapid mode. Additionally this system makes clearer the appearance of the dual set of the two modes of movement.

The transfer function $KG(s)$ in open loop of the system can be written as follows:

$$KG(s) = \frac{\Omega_o^2}{s^2 + 2D_o s + \Omega_o^2} \times \frac{-m\,Kx\,(s+a)}{s^2 + 2d_o s + \omega_o^2}$$

Assuming the hypothesis that the pass band of the power stage is sufficiently large before the pass band of the process ($\Omega_o \geq 3\,\omega_o$) the transfer function in closed loop can be written as follows:

$$\frac{KG(s)}{1+KG(s)} = \frac{-m\,Kx\Omega_o^2(s+a)}{(s^2 + 2d_1 s + \omega_1^2)(s^2 + 2d_2 s + \omega_2^2)}$$

in which $d_1 \sim d_o + m\,Kx$  $\qquad \omega_1^2 \sim \omega_o^2 + a\,m\,Kx$ $d_2 \sim D_o - m\,Kx$  $\qquad \omega_2^2 \sim \Omega_o^2 - a\,m\,Kx$ It clearly appears therefore that the sum of the logarithmic decrements of the two modes of movement of the loop system is constant namely:

$$d_1 + d_2 = d_o + D_o$$

In order to demonstrate the relation associated between the energy and the logarithmic decrement, the transfer function in closed loop is written as a rational fraction as follows:

$$\frac{-m\,Kx\Omega_o^2(s+a)}{(s^2 + 2d_1 s + \omega_1^2)(s^2 + 2d_2 s + \omega_2^2)} = \frac{P_1 s + Q_1}{s^2 + 2d_1 s + \omega_1^2} + \frac{P_2 s + Q_2}{s^2 + 2d_2 s + \omega_2^2}$$

in which after having effected the calculations $$\begin{cases} P_1 = \dfrac{-m\,Kx\Omega_o^2[\omega_2^2 - \omega_1^2 - 2a(d_2 - d_1)]}{(\omega_2^2 - \omega_1^2)^2 - 4(d_2 - d_1)(\omega_2^2 d_1 - \omega_1^2 d_2)} \\[2ex] Q_1 = \dfrac{-m\,Kx\Omega_o^2[a(\omega_2^2 - \omega_1^2) - 2(d_2 - d_1)(2ad_1 - \omega_1^2)]}{(\omega_2^2 - \omega_1^2)^2 - 4(d_2 - d_1)(\omega_2^2 d_1 - \omega_1^2 d_2)} \end{cases} \quad (5)$$

$$\begin{cases} P_2 = -P_1 \\[2ex] Q_2 = \dfrac{-m\,Kx\Omega_o^2[a(\omega_1^2 - \omega_2^2) - 2(d_1 - d_2)(2ad_2 - \omega_2^2)]}{(\omega_2^2 - \omega_1^2)^2 - 4(d_2 - d_1)(\omega_2^2 d_1 - \omega_1^2 d_2)} \end{cases} \quad (6)$$

It is noted that;

$$Q_1 = \frac{-m\,Kx\Omega_o^2 a}{\omega_1^2} - \frac{\omega_2^2}{\omega_1^2} Q_2$$

When considered in the domain of time, the relation (4) can be expressed in the form:

$$q(t) = q_1(t) + q_2(t)$$

within which the first member of this identity represents the total impulse time response whereas the two terms of the second member represent the components of low frequency and of high frequency of this impulse response, these two terms being written as follows:

$$q_1(t) = A_1 e^{-d_1 t} \cos(\hat{\omega}_1 - \rho_1)$$
$$q_2(t) = A_2 e^{-d_1 t} \cos(\hat{\omega}_2 - \rho_2)$$

with $$\hat{\omega}_1 = \omega_1 \sqrt{1 - z_1^2}$$

$$\hat{\omega}_2 + \omega_2 \sqrt{1 - z_2^2}$$

$z_1$ and $z_2$ being respectively the reduced damping of the process and the reduced damping of the servo-control in closed loop and on the one hand $$A_1 = \frac{P_2}{\cos \rho_1}$$

$$A_2 = \frac{P_2}{\cos \rho_2}$$

and on the other hand $$tg\,\rho_1 = \frac{-P_1 d_1 + Q_1}{P_1 \hat{\omega}_1}$$

$$\text{and } tg\,\rho_2 = \frac{-P_2 d_2 + Q_2}{P_2 \hat{\omega}_2}$$

The energy $E_1$ and $E_2$ of each of these modes can thus be obtained by integrating from 0 to infinity the square of the time responses of these modes:

$$q_1^2(t) = \frac{A_1^2}{2} e^{-2d_1 t}[1 + \cos 2(\hat{\omega}_1 t - \rho_1)]$$

$$q_2^2(t) = \frac{A_2^2}{2} e^{-2d_2 t}[1 + \cos 2(\hat{\omega}_2 t + \rho_2)]$$

$$\int_0^\infty q_1^2(t)\,dt = \frac{A_1^2}{4\omega_1}\left[\frac{1}{z_1} + \sin(2\rho_1 + \lambda_1)\right] = E_1$$

-continued $$\int_0^\infty q_2^2(t)\, dt = \frac{A_2^2}{4\omega_2}\left[\frac{1}{z_2} + \sin(2p_2 + \lambda_2)\right] = E_2$$

with $\sin \lambda_1 = z_1 \qquad \sin \lambda_2 = z_2$ $\cos \lambda_1 = \sqrt{1 - z_1^2} \qquad \cos \lambda_2 = \sqrt{1 - z_2^2}$ By effecting the following approximations $P_1 \sim -mKx$ $Q_1 \sim -\frac{mKx}{\omega_1^2} a\Omega o^2 + \omega_1^2[a + 2(d_2 - d_1)]$ $P_2 \sim +mKx$ $Q_2 \sim mKx[a + 2(d_2 - d_1)]$ and neglecting $z_2^2$, which is possible due to the fact that in practice $z_2$ is most often less than 0.25, the following relation can then be written:

$$\frac{E_1}{E_2} \sim \frac{d_2}{d_1} = \frac{Do - mKx}{d_o + mKx} = \frac{Do - k}{do + k} \quad (10)$$

$k$ being the product of the gain of high frequency of the process and the gain of the damping system, that is to say, the total gain of the system.

The relation (10) also shows that when the relation between the energies is maintained constant, the total gain $k$ remains constant. This means that the gain $Kx$ of the damping system varies so as to compensate the variation of gain of high frequency of the process, i.e., the effectiveness of the control action effected on the controlled process.

With reference to the drawing, the regulation system, corresponding to the basic system of fourth order as previously noted, is essentially composed of a control chain 1, a feedback loop 2 for conventional regulation and an adaptation loop 3 for a damping member 4 disposed in the feedback loop 2. The control chain 1 comprises, in conventional manner, a comparator amplifier 5 having two inputs, one receiving a control signal 6, the other being connected to the feedback loop 2. The output of amplifier 5 is connected to a servo control member 7 which acts on the process stage 8.

The feedback loop 2 successively comprises a detection member 9 for the control parameter of process stage 8, an optional corrector network 10 and the damping member 4. As is well understood, in the case of a basic system of the fourth order, the corrector network 10 is inoperative and can be omitted. It is also noted that to facilitate the understanding of the system, the damping member 4 can be combined with a rheostat disposed in series in the feedback loop and whose position can be controlled by means of an electrical signal.

The adaptation loop 3 is composed of two circuits 12, 13 connected in parallel, each receiving the information from the detection member 9 and whose output signals are compared in a comparator 14. The signal furnished by the comparator 14 is transmitted through an integrator 15 which effects the control of the damping member 4.

The circuit 12 is composed of a filter element 16 for example a filter of low-pass type which furnishes the time response $Q_1$ of the slow mode of the regulated system to a calculation member 17 furnishing to an input of the comparator 14 a signal representative of the energy $E_1$ of this mode. This calculation member 17 can effect in this respect the integration of the square of the time response $Q_1$ or in simple manner the integration of the absolute value of the time response $Q_1$.

In the same manner the circuit 13 comprises a filter element 18 of high-pass type which furnishes the time response $Q_2$ of the high frequency mode to a calculation member 19 analogous to the member 17. The signal representing the energy $E_2$ of the high frequency mode is then multiplied in multiplying member 20 by a quantity $\mu$ representative of the relation $d_2/d_1$ of the logarithmic decrements of the high frequency mode and of the slow mode. The resultant of this multiplication is then transmitted to the second input of the comparator 14. At the output of the comparator 14 there is obtained a signal E representaive of the difference $E_1 - \mu E_2$.

However, as has been previously demonstrated (equation 10) the relation $E1/E2$ of the energies should remain constant in order that the total gain remains constant. As a consequence, the difference $E_1 - \mu E_2$ should always tend to remain at 0.

When the stabilized process evolves from one configuration to another, a change is produced in the internal dynamics of the regulating loop and, as a consequence, the relation of the energies $E_1/E_2$ is modified. This change is translated at the level of the adaptation loop 3 by a signal $E = E_1 - \mu E_2$ which is not 0. The integrator 15 then furnishes to the damping member 4 a control signal determining a damping value for which the difference $E = E_1 - \mu E_2$ returns to 0.

What is claimed is:

1. A method of regulating the process of a system by self-adaptive damping characterized by energy balance, said process comprising regulating the damping in different regimes in which the process evolves by producing a first signal indicative of a relation expressing the constancy of the sum of the logarithmic decrements of all of the modes of proper movement of the regulated system indicating that all augmentation of stability of one mode obtained by change of regulation is compensated by a loss of stability of one or a plurality of other of said modes and a second signal indicative of the relation of the energies of the modes with respect to the corresponding logarithmic decrements, and combining the signals to establish a connection between the relationships of energy and of stability and thereby of the energy of the different modes as a function of the gain of adjustment.

2. A method as claimed in claim 1 comprising utilizing in addition to the second signal a further signal signifying that the relation of the energy of the two principal modes in which the regulation system evolves, namely the modes of the servo-control member and that of the control process, is substantially equal to the inverse of the relation of these logarithmic decrements corresponding to these modes such that by maintaining the relation of the energies constant the total gain of the regulated system remains constant and as a consequence the gain $Kx$ of the damping arrangement varies in a manner to compensate the variation of the gain at high frequency of the process.

3. A self-adapting damping system having energy balance utilized in a regulated system having a servo control with high-frequency and low-frequency modes of operation, said self-adapting system comprising a control chain and a feedback loop comprising detection means, in operative association therewith, and a controllable damping means, said system further comprising an adaptation loop at least partly in parallel with said feedback loop and coupled to and utilizing information delivered by said detection means and coupled to and effecting control of said damping means, the said adaptation loop including a comparator, an integrator, and two circuits connected in parallel and furnishing to said comparator a first signal which is a function of the energy of the slow mode of the regulated system in the occurrence of the process mode and a second signal which is a function of the product of the energy of the rapid mode and of the relation of the logarithmic decrements of these two modes, said comparator furnishing the result of this comparison to said integrator which is connected to the controllable damping means.

4. A damping system according to claim 3 wherein one of the two said circuits includes a low pass filter which furnishes an impulse time response of the slow mode and a calculation means coupled to said filter and furnishing to said comparator a signal representative of the energy of this mode, said calculation means effecting integration of the square of said time response or the integration of the absolute value of said response.

5. A damping system according to claim 4 wherein the other of said two circuits comprises calculation means, multiplying means, and a high-pass filter which furnishes the impulse time response of the high-frequency mode to said calculation means which generates a signal representative of the energy of the high frequency mode, which signal is then multiplied in said multiplying means by a quantity representative of the relation of the logarithmic decrements of the high frequency mode and of the slow mode.

6. A damping system according to claim 3 wherein said feedback loop includes corrector means between said detection means and damping means.

7. A self-adaptive damping process having energy balance and applicable to servo systems with feedback loop to adapt the damping to different regimes in which the process evolves, said process comprising maintaining constant the ratio of the energy of at least two modes of movement of the controlled system such that the total gain of the controlled system remains constant, the constant of said ratio being equal to the inverse ratio of corresponding logarithmic decrements.

8. A process as claimed in claim 7 in which the modes of movement whose energy ratio is maintained constant are the two principal modes in which the controlled system evolves.

9. A process as claimed in claim 8 in which said two principal modes are those of the servo-control member and the controlled process.

* * * * *